Dec. 1, 1936. E. R. LOCHMAN 2,062,323
COMBINED HEADLIGHT AND DIRECTION INDICATOR FOR VEHICLES
Filed July 26, 1930 5 Sheets-Sheet 1

INVENTOR.
BY Emil R. Lochman
ATTORNEY.

Dec. 1, 1936.  E. R. LOCHMAN  2,062,323
COMBINED HEADLIGHT AND DIRECTION INDICATOR FOR VEHICLES
Filed July 26, 1930  5 Sheets-Sheet 3

INVENTOR.
Emil R. Lochman
BY
ATTORNEY.

Dec. 1, 1936.  E. R. LOCHMAN  2,062,323
COMBINED HEADLIGHT AND DIRECTION INDICATOR FOR VEHICLES
Filed July 26, 1930  5 Sheets-Sheet 5

Patented Dec. 1, 1936

2,062,323

UNITED STATES PATENT OFFICE 2,062,323

COMBINED HEADLIGHT AND DIRECTION INDICATOR FOR VEHICLES

Emil R. Lochman, Milwaukee, Wis.

Application July 26, 1930, Serial No. 470,985

12 Claims. (Cl. 177—337)

This invention relates to combination headlights and traffic signals for motor vehicles, and to a system for mounting and operating same, and enbodies improvements over the apparatus covered by my Patent No. 1,733,613, dated October 29, 1929.

The primary object of this invention is to provide a vehicle headlight system having new features and capable of furnishing important services in addition to those of the headlights now in use without increasing the consumption of electric current used or adding lamps, and to increase the safety and riding comfort and enjoyment of the users of the vehicle.

A further object of the invention is to provide novel, practical and effective means and devices for enabling the vehicle operator to give to others warning signals of intended movements of the vehicle, thereby increasing the safety of the vehicle in traffic.

Another object of the invention is to provide control mechanism arranged in such relation to the steering wheel of the vehicle that the operator need not remove his hands from the wheel in order to operate the headlight and signal apparatus.

Still another object of the invention is to provide, in combination with the headlights of a vehicle, means whereby a portion of the light may be reflected in any desired direction, the remainder being normally projected ahead upon the road, whereby the headlights may be used also as spotlights and to illuminate the sides of the road, and render road markers, signs, crossroads, etc., visible.

A further object of the invention is to provide a direction signal which will be apparent in either day or night driving.

Another object of the invention is to provide a device of this character which is applicable to any automobile without special alteration of the parts of the automobile.

A further object is to reduce traffic noise by providing a small horn for ordinary city driving, while a larger horn is provided for country driving. Moreover, the larger horn may be used for giving quick and powerful danger signals and it may be sounded separately or in conjunction with the small horn; and these horns have, preferably, different pitch and tone qualtities.

A further object is to have the moving parts of the headlights small and of relatively light weight, and to provide an automatic release for returning these parts to their normal straight-ahead position when the driver has started the turning of a corner.

A further object is to provide a means for rear signalling which is positive and more certain than the present system of hand signalling, and of such a nature that the driver is apprised of its operation by use of his windshield mirror.

A further object is to provide means whereby the driver can watch the performance of his own front signalling during both day and night driving.

A further object is to provide means whereby the front and rear signalling may be performed by the driver by one movement of a lever without releasing his hands from the steering wheel, and another object is to combine these light signals with a sound signal by the same single operation of a lever.

A further object is to increase the use and range of the headlight without the use of additional lights and current by the use of a more efficient lens, as well as to enhance the attractive appearance of the headlights by the use of ornamental pointers or direction indicators provided with brightly illuminated colored prisms.

With the above and other objects in view the invention consists of the improved combination headlight, spot light and traffic signals for vehicles, for both front and rear signalling, and their parts and combinations, as I will proceed now more particularly to explain and finally claim.

In the accompanying drawings illustrating the invention, in the several figures of which like parts are similarly designated.

Referring now to the drawings, M is the motor vehicle having the left and right-hand headlights I and O, respectively, mounted in the usual manner.

The pointers I form a prominent part of my invention and must be of such form as to readily indicate their purpose to the driver of an approaching vehicle. They are, preferably, of ornamental character, and are shaped to substantially conform to the shape of the headlights with their outwardly curved lenses 24. Moreover, they must work in prominent and unmistakable relation with the sign "Turn" indicated at 25 and appearing on the top sections 29 of the lenses 24, to show to which side of the road the driver intends to turn. Each of the pointers I has a central cross rib I' clearly dividing it into a front and rear part, which curve downward away from the rib I'. The front part terminates in an arrow-like head 2 which has a circular opening 3' into which is set a transparent glass prism 3, preferably of red color, which is illuminated by the light 18, thereby strongly calling attention to the pointer, so that the turn signal is visible at a considerable distance in front of the automobile, especially at night when hand or other signalling cannot be seen by the oncoming driver or by pedestrians. As is well known, at night the only clearly visible parts of an oncoming automobile are the headlights, and their glare negatives the visibility of any hand signalling. Therefore, the moving red lights of the signalling crystals or prisms 3 in front of the headlights is of great service, these headlight signals being read in conjunction with the stationary sign "Turn". Thus when the pointer I with its head 2 and red crystal 3 is swung to the side to which the driver intends to turn, the drivers of oncoming vehicles will be informed of his intention. The letters forming the word "Turn" are preferably molded into the curved lens 24, and clear spaces 25' and 25" are provided at the left and right thereof, respectively. Thus when a left turn is to be made the head 2 of the pointer I is swung into the space 25' and when a right turn is to be made the head 2 of the pointer I is swung over into the space 25". Therefore, no matter to which side of the sign "Turn" the pointer is located, the sign itself is clearly visible.

The rear part of each of the pointers I terminates in an eye through which a pivot bolt 4 is loosely passed and is fastened to the flat end 5" of a connecting rod 5, which connects the pointers of both headlights for similar joint pivotal action.

The headlights I and O are alike in all their structural features, except that the reflectors 10 are pivotally mounted therein so that their concave sides 11 face each other, while their convex sides 12 face outwardly to their respective sides of the road. These reflectors 10 have double sided reflecting surfaces as just indicated, that is to say, their concave as well as their convex sides are silver or chromium plated and polished, or otherwise appropriately treated for reflecting light.

Figure 4:
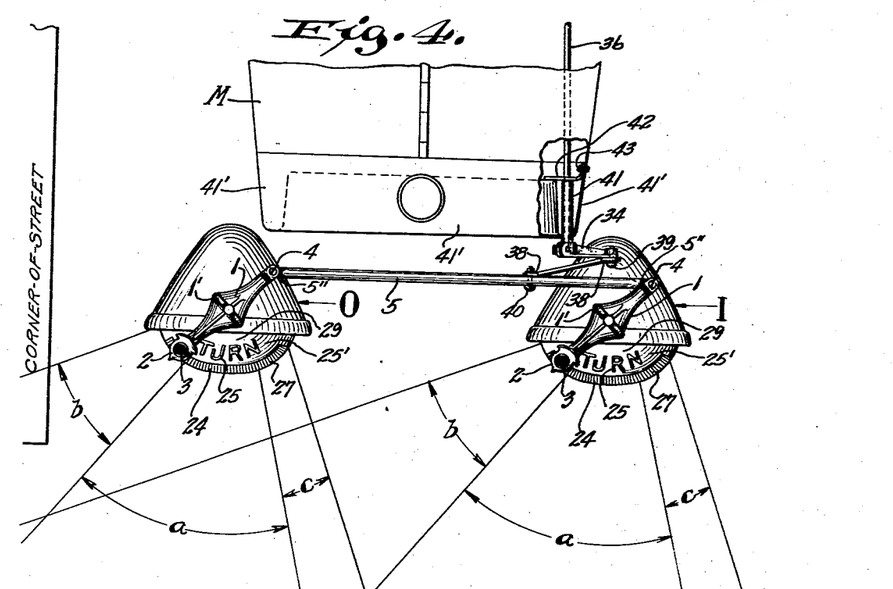
Fig. 4 is a plan view of the headlights and their mounting, the operating and moving parts being shown as set for a right-hand turn as in Fig. 1.
Figure 9:
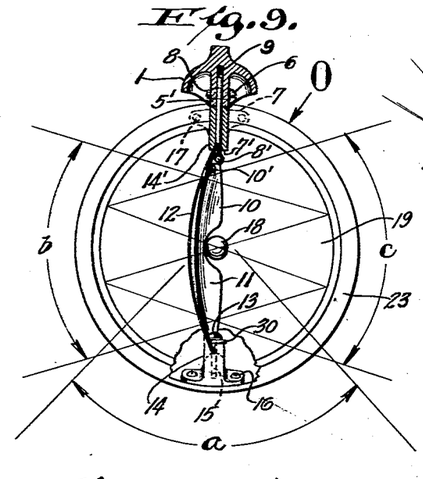
Fig. 9 is a sectional front view of the right-hand headlight with the lens removed, and showing the movable reflector in its normal position for straight-ahead driving.

The action and direction of the light thrown out by the two headlights due to the cooperation of the movable reflectors 10 with the lamps 18 and the customary reflectors 19, are practically alike. This is best shown in Fig. 9, where when the reflectors are set for straight-ahead the side light sections b and c are thrown out at substantially the same angle in a sideways and up-and-down direction, and considerably increase the lighting up on each side of the road. However, it has been noted that the light reflected from the concave sides 11 appears to be somewhat stronger than that reflected from the convex sides 12, and by turning these sides 11 inward or toward each other, the headlights give better service by having the greater range and forming the forward part of the combined light sections b b from both headlights when the reflectors are turned to the right, as they light up the side of the road and street crossings and give a light signal across corners while the car is still moving straight ahead, as best shown in Fig. 4. It is thus seen that when the reflectors 10 are turned either to the right or to the left the forward part or section of the combined light streams b b or c c is always thrown out by the concave sides 11 while the convex sides 12 always form the rear part or section of these light streams. Thus, a concave side 11 and a convex side 12 always work together in the same relation.

Figure 10:
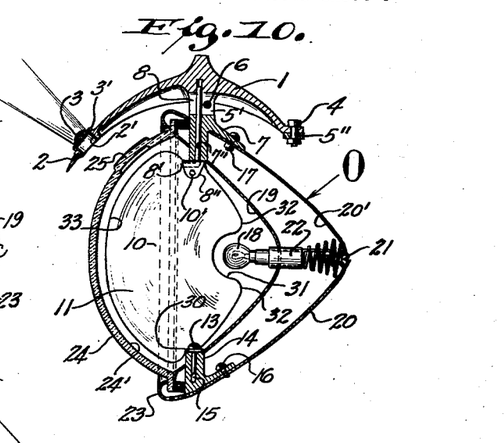
Fig. 10 is a vertical, longitudinal sectional elevation of the same headlight and its pointer, the movable reflector being shown in full side view.

The movable reflectors 10 are connected with the pointers 1 by the pivots 8 for joint pivotal movement. Each reflector 10 has a bent flange 8" by which it is firmly connected to the right angle terminal bend 8' at the lower end of its respective pivot 8, while the upper part of the pivot is firmly clamped in the split hub 5' of the pointer by a clamping screw 6. The joint upper bearing for the pivot 8 of both the reflector and the pointer is formed by a bearing member 7 which is mounted by means of bolts 17 or other suitable fastenings on the casing 20 of the headlight and has a hub 14' extending downward inside the reflector 19, where its end face 7' bears against the flange 8" of the reflector, while the bore 7" forms the bearing for the pivot 8. The lower bearing for the reflector 10 is formed by the hub of a bearing member 14 having a flange attached to the inside of the casing 20 as by screws or the like 16. The upper face of this hub forms the surface on which the lower bearing flange 30 of the reflector turns, a pivot pin 13 extending into a bore 15 of the hub to form the lower pivotal bearing for the reflector. These two pivots 8 and 13 have their axes in true vertical alinement and are so arranged relatively to the flange ring 23 which holds the outwardly curved lens 24, that said ring and lens can be taken off for replacing or adjusting the lamp 18 without disturbing any of the other parts (see Fig. 10). A clear space is provided between the customary reflector 19 and the rear edge of the movable reflector 10 by forming a recess 31 in such rear edge, thus reducing the rearward curve of the reflector so that its rear edge portions 32 provide considerable clearance. Thus the lamp 18 can freely illuminate the entire interior of the headlight, and the reflector 10 in no way interferes with the proper action of the customary reflector 19 in lighting up the road. Therefore, while the reflector 10 is set in its normal forward position, the headlight furnishes the customary road illumination represented mainly by the light sections marked a, Fig. 9, and the reflector 10 improves the side lighting of the road when in such normal forward position. It will be noticed, however, that the light streams b and c increase in height from twelve to twenty feet as the reflectors 10 turn sideways in either direction, in proportion to the increasing angle from straight ahead, and in proportion to the distance the light is projected. The larger part of the reflector 10 extends forward from its pivotal axis and terminates in the forward curve 33, which again leaves a space for free pivotal action of the reflector relatively to the inner side 24' of the lens 24, which has a similar curvature.

Figures 11, 12, 13, 14:
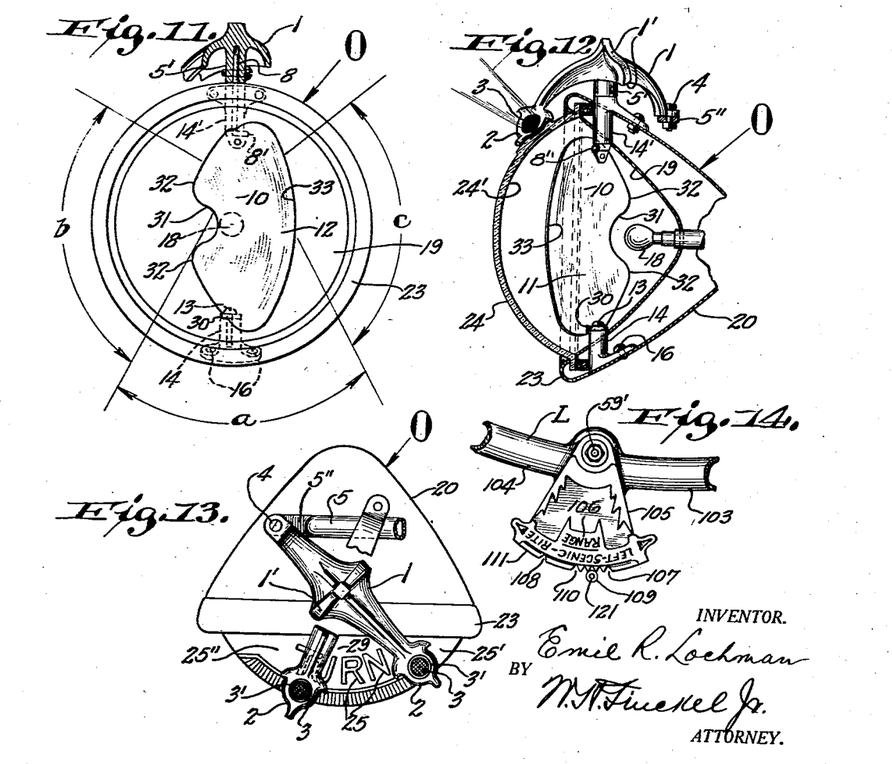
Fig. 11 is a view similar to Fig. 9 but showing the reflector at an appropriate angle for a left-hand turn.
Fig. 12 is a view similar to Fig. 10 but showing the pointer and its mounting in elevation and it and the reflector at an angle as in Fig. 11.
Fig. 13 is a plan view of the right-hand headlight, showing the effect of the pointer being turned for a left-hand turn, as in Figs. 11 and 12, a fragment of the pointer being also shown in night driving position in which the reflector lights up the right side of the road.
Fig. 14 is a fragmentary plan view of the central indicating section of the control lever.

Figs. 11 and 12 illustrate a left hand turn of the pointer and reflector 10, showing the latter turned at an angle of about forty-five degrees and covering the light 18 so that its forward rays are deflected by the concave side 11 which in coaction with the customary reflector 19 throws out a bright section of light c in an angular direction mostly sideways. It will be noticed that this light section c has a decided vertical diffusion and lights up the ditch as well as any object at the side of the road in a continuous stream of light, which increases in height according to the distance it is projected, as hereinbefore mentioned, while the section b is also bright enough to give a good light on the road. The section a indicates the straight-ahead road light which is bright enough for straight ahead driving, but has the great advantage that all the glaring effect is taken out of it by the turned reflector 10, and this is of great importance as the oncoming driver is protected thereby, and the combined light and sign signals "Turn" of the headlights show up that much stronger and clearer. Moreover, the light section c is much stronger than the section a and this section c is projected across the road and is readily visible in the darkest night or in the most dense and foggy weather.

Figures 1, 2:
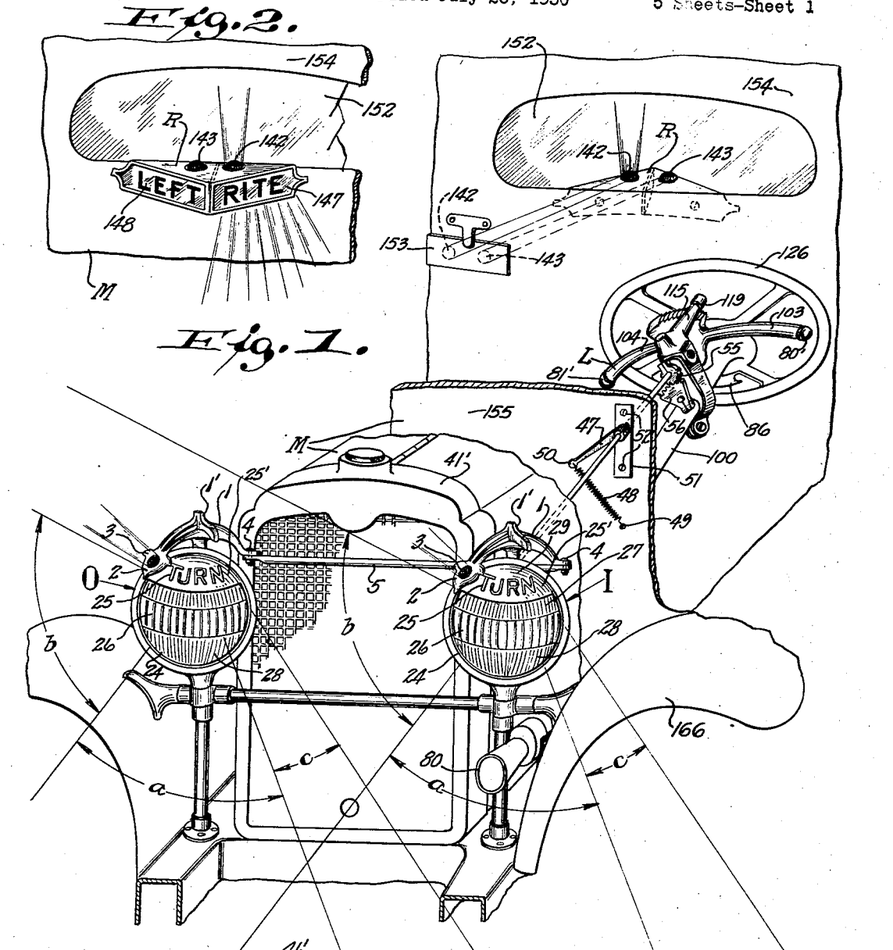
Figure 1 is a perspective view of the device of the invention and the parts of an automobile to which it is related and attached, the headlights and pointers being shown in full front view, and the entire device shown in position for signalling a right-hand turn.
Fig. 2 is a perspective view of the rear signal, and read with Fig. 1 illustrates the method of mounting and operating same.

The light effects from the headlights caused by turning the reflectors 10 are further illustrated in Figs. 1, 4, 5 and 6. Figs. 1 and 4 show the effect caused by setting the entire device for a right hand turn, where the combined sections b b from the two headlights O and I are projected across the street corner while the car is still running straight ahead, and as the modern headlights are normally of twenty-one candle power for each light, this combined light stream is forty-two candle power, and strong enough to be noticed even if the street crossing is provided with ordinary street lighting, so that a pedestrian or the driver of an oncoming automobile or other vehicle is warned by this light signal of the intended turning of the car equipped with my invention. As explained before, the section a in this position is slightly dimmed and without glare, and the pointers 1 with their brightly illuminated red crystals or prisms 3 give a very impressive signal by pointing out the direction which is read with the brightly illuminated sign "Turn", and it will be noticed that this signal given by the two pointers 1 is just as impressive in daylight, especially as a sound signal with one of the horns can be given with the same motion of the lever L by pressing one of the button switches 80' or 81' while pulling the respective end of the lever.

Figures 5, 6, 7, 8:
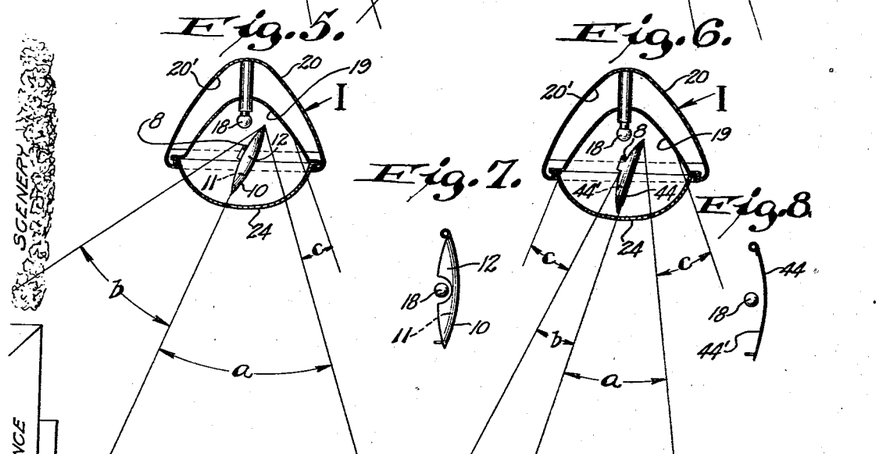
Fig. 5 is a sectional plan view of a headlight provided with a reflector of concavo-convex or saucer-like form, curved upon both its vertical and horizontal axes and showing the light reflecting effect with the reflector partially turned for night driving and lighting up the right side of the road.
Fig. 6 is a view similar to Fig. 5 but showing a modified reflector which is curved upon its vertical axis only, the reflected light sections a and b from which are seen to be considerably narrower than as produced by the reflector of Fig. 5.
Fig. 7 is a front view of the reflector of Fig. 5 detached, but with a lamp arranged in proper relation thereto.
Fig. 8 is a similar front view of the reflector of Fig. 6.

The size of the light sections projected by the movable reflectors can be controlled to suit traffic laws or regulations of various localities, by their respective form, and Figs. 5 and 6 show this variation. In Fig. 5 the reflectors 10 are dished and curve in all directions, which causes the light sections a and b to spread considerably, and this is the reflector shown in all the illustrations except Figs. 6 and 8. Figs. 6 and 8, however, show a movable reflector which in all its details is like reflector 10 but is flat in longitudinal section normal to its pivotal axis and curves only on its vertical axis as shown in Fig. 8; and it will be noticed that the light sections *a* and *b* projected by this reflector are only about half as wide as those projected by the dished reflector 10 of Fig. 5. Between a straight section reflector as shown in Figs. 6 and 8, and the dished reflector of the other views, the curves of the reflectors can be varied to produce almost any width of light section desired. It will be noted that the vertical curvature of the reflector 10, as best shown in Fig. 9, is relatively flat in the upper and lower portions of the reflector, and this form is used to control the vertical diffusion of the light stream projected by these reflectors 10.

The controlling apparatus of which the control lever L is the most prominent feature, has a pivot 59, and a segmental portion 105 extending therefrom provided with an arcuate surface 111, see Fig. 14. A number of notches are cut in this arcuate surface, of which the notches 107 and 108 are for determining the extreme right and left movement, respectively, of the pointers 1 and reflectors 10, while the notch 110 is for the central straight ahead position of these parts. Also a number of notches are provided between the notches 110 and 107 and these are for setting the reflectors 10 for various positions of road lighting so that dangerous obstacles, the edge of the road surface, and flaws in the side of the road or ditch, may readily be seen. Moreover, with such a setting road crossings at a considerable distance may be noted, and a view for a considerable distance to the side may be had to thus detect oncoming drivers on cross roads, or oncoming trains, or interurban street cars, as well as pedestrians, to thereby avoid accidents. These notches are further used to focus the vertically diffused light to thus facilitate the reading of all road signs and to enable the occupants of the vehicle to enjoy the scenery while driving at night, thereby greatly increasing the enjoyment of a trip. The segmental portion 105 bears two small arrow heads pointing in the directions the lever is to be pulled for right and left turning, and the top surface of this portion 105 bears also directions for the use of the lever L in connection with the various notches, for focusing the light streams of the headlights in various directions (see Fig. 14). A ratchet 115 (Fig. 21) is provided, this ratchet carrying a small roller 109 for engaging the notches just described and holding a set position of the lever L and the parts controlled thereby as long as desired. If Fig. 14 is read together with Fig. 5, the above explanation will be readily understood. The parts will be held in position for a right hand turn as shown in Fig. 4 by the notch 107. It will be noted further that no notches are provided between the notches 108 and 110. This is for the purpose of preventing the light from being held permanently at any slight angle over the left side of the road, to thus guard against annoying or confusing oncoming drivers.

Figure 3:
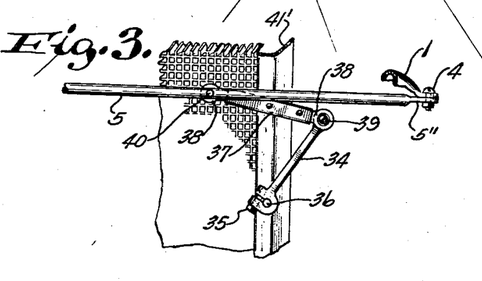
Fig. 3 is a front view of part of the mechanism for operating the devices applied to the headlights, a part of the automobile radiator and its casing being shown in sectional perspective.

The controlling apparatus for the pointers 1 and reflectors 10 is arranged as follows: The connecting rod 5 for the pointers 1 has a pivot 40 to which one end of a link 37 is pivotally attached, the other end of this link being attached to a pivot 39 carried by one end of a lever 34 which is rigidly mounted on the front end of an operating rod 36 and fixed to turn therewith by the clamping bolt 35. The link 37 must accommodate the forward and backward swinging motion of the rod 5 and therefore its ends are preferably made of flexible material, or the entire link may be made of rubber or leather with proper stiffening means for the central part, as best shown in Fig. 3. The operating rod 36 has a front bearing 41 provided with a mounting flange 42 by which it is firmly mounted on a suitable support such as the outer part of the radiator casing or shell 41' as by bolts 43 or the like, see Fig. 4. This bearing 41 may also form the thrust bearing for the hub of lever 34. Passing rearward the operating rod 36 has another bearing 53 passing through the dashboard or partition 155 being mounted thereon by means of its flange 51 and screws 52. The inner end of rod 36 passes through the bore 36' of the bearing block 54 (Figs. 23 and 24) which is held in the wiring bridge B by the bolt 54' which also holds the two sections 124 and 128 of said bridge together after they have been properly adjusted and the mounting block 61 has been inserted. With these parts thus assembled the open flanged ends 125' of the bridge B are passed around the steering column 100, the bolt 125 passed through the holes in the flange 125' and this end of the wiring bridge clamped tight to the steering column as shown in Figs. 15, 16, 19 and 20. The front end of this bridge is held by flanges 129 and bolts 130 to the instrument board 131. The slots 129' are provided for up and down adjustment and the slot 54'' is provided for in and out adjustment of the bridge in order to accommodate same to adjustable steering posts. Where the steering post of a certain make of automobile is rigid, this bridge is made and stamped out of one piece of sheet metal. The mounting block 61 is preferably molded out of some non-conducting material, such as the phenolic condensation product known as bakelite, with inserts molded in place, and has a bearing sleeve 58 through which passes the pivot 59. This pivot 59 has an upper reduced portion 59' provided with as screwthread 60 and this portion 59' passes through the bore 57 of the lever L and is firmly connected therewith by the nut 60'. The lower projecting end of the pivot 59 carries the segmental gear 56, which is firmly clamped thereon, and this gear meshes with the segmental pinion 55 which is firmly clamped to the end of rod 36 and bears against the face of bearing block 54, a pocket 61' being provided in the block 61 to furnish clearance for its free operation, see Figs. 1, 15 and 20.

It will be understood from the foregoing that the lever L is arranged for pivotal action on the mounting block 61, but its pivotal action is very limited, the ends of the arms 103 and 104 requiring a motion of only about two inches toward the driver to turn the pointers 1 to an angle of say about forty-five degrees, so that their heads 2 reach the required position to indicate a right or left turn. Two stops 62, formed as raised portions of the mounting block 61, limit the movement of the arms 103 and 104 of the lever L. When the arm 104 is in contact with its stop 62, in position to indicate a right hand turn, the ratchet roller 109 enters the notch 107 and holds the parts in this position, but when the driver gives the steering wheel about a half turn the head 86 of the release member 85 strikes the roller 119 which is carried by the ratchet 115 and pushes the ratchet outward thus releasing the small roller 109 from the notch 107 and permitting the lever 47 under the influence of its spring 48 to automatically pull the entire controlling apparatus back to its original straight ahead position, this position being maintained until subsequent operation of lever L by the small roller 109 dropping into the notch 110. As shown in Fig.

Figures 15, 16, 17, 18, 19, 20, 21:
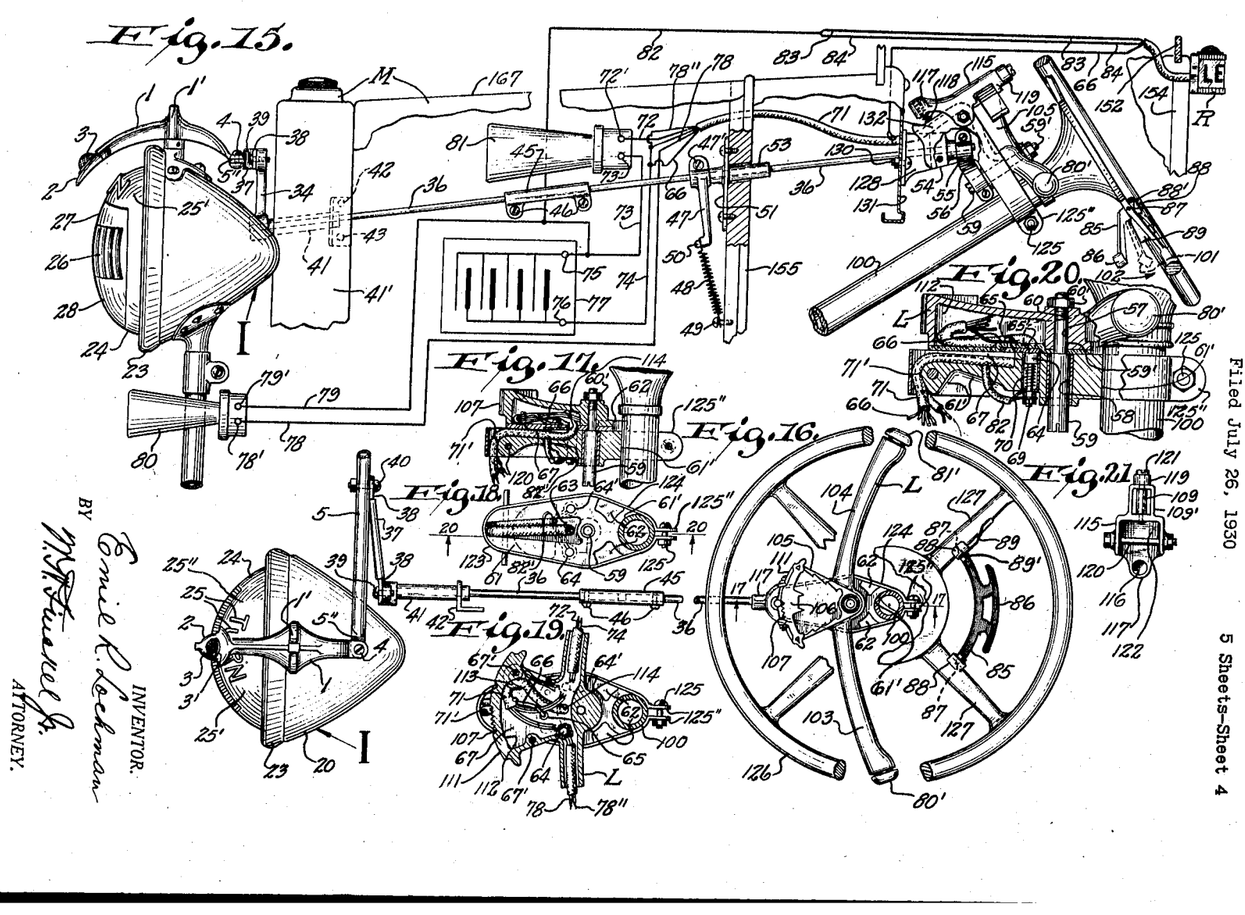
Fig. 15 is a sectional side elevation of the entire device of the invention, a portion of those parts of an automobile to which it is operatively attached, the electrical circuit being shown diagrammatically.
Fig. 16 is a plan view of the controlling apparatus in operative relation to the steering wheel, and of a headlight and pointer, as well as the rod and link connection between the controlling apparatus and the headlight, all shown in straight-ahead position, and with parts broken away in the interest of clearness.
Fig. 17 is a fragmentary sectional side elevation taken on line 17—17 of Fig. 16.
Fig. 18 is a plan view of the mounting block applied to the steering column, the latter being shown in section.
Fig. 19 is a sectional plan view of the central indicating section of the control lever showing the inside pocket thereof and the wiring located therein.
Fig. 20 is an enlarged view similar to Fig. 17, but taken on the line 20—20 of Fig. 18, bringing out the switch connections for the operation of the rear signal, and showing also the location and loop connections of the electric cables.
Fig. 21 is a front view of the ratchet for holding and releasing the control lever.

15, the lever 47 is rigidly clamped upon the rod 36 by a bolt or screw 47' and its free end 50 is connected by the spring 48 to the dashboard or partition 155 as indicated at 49.

The release 85 is kept in its normal position as shown in Fig. 15, for all regular driving, so that it is only necessary for the driver to pull the right arm 104, or the left arm 103 for a right or left hand turn, respectively, to its respective stop 62, the above described automatic action of the release 85 always returning the parts to their original straight ahead position. However, for parking, or for putting the car into the garage, which is usually located in a dark alley, the release 85 is pushed upward in the direction of arrow 102 to the dotted position 101, and the spring clip 89 being engaged with and having a frictional bearing against a spoke 127 of the steering wheel keeps the release 85 in this position where it cannot operate the ratchet 115 and thus the light is kept directed in any position best suited for such parking or driving into a garage. When the car is again used for regular driving the release 85 is pushed downward to its regular driving position as shown in Fig. 15.

It will be noted that only two small countersunk holes are required to be put into two of the spokes 127 of the steering wheel for operatively mounting the release 85 in position and setting the screws 87 through the respective flanges 88 of the release 85 into said countersunk holes. The spring clip 89 is fitted over one of said screws and is held in frictional tension against the adjacent spoke 127 by a nut 89'. The flange 88 to which the clip 89 is applied has a tapered section 88' provided so that the clip can be turned upward and rest on said tapered face, and in its lowered position it rests on the flat part of the flange 88.

The ratchet 115 is mounted for pivotal action on the bridge B by means of a bolt 120, and the upper portion of the bridge B and mounting block 61 fit into the pocket 122 of the ratchet. The little roller 109 is carried in a bearing extension 109' and the release roller 119 is mounted on top of this extension. Both rollers are held by and turn on the same pivot 121. The lower end of the ratchet is provided with a boss 117, and a spring 118 inserted into the socket 116 in this boss bears against the extension 132 of the bridge B and furnishes the yielding pressure for the ratchet to press its little roller firmly into the notches of the portion 105 of the lever L. The pressure of coil spring 118 must be strong enough to resist the pulling action of the spring 48 to thus hold the entire device in any desired set position until the release 85 pushes the ratchet back and permits lever 47 and spring 48 to automatically return the entire device to its straight ahead position as described.

For operating the device it is desirable that the outer ends of the arms 103 and 104 of the lever L require as little motion as possible, so that the required movement of the arms can be accomplished in most cases by simply stretching the fingers of the right or left hand and operating the respective arm by the closing of the fingers against it, the thumb remaining meanwhile in its position on the steering wheel. For this purpose the ratio of the segmental gear 56 to the segmental pinion 55 is approximately three to one. For ease of assembling, the rod 36 is made of two lengths, and after they are properly inserted in their bearings, they are firmly coupled together by the clamping sleeve 45 and screws 46.

I will now describe the mounting block 61 and the rear signal R and their working relation. The rear signal includes a base plate 133 having a surrounding flange 134 and central division wall 135 through which the lamp sockets 136 and 137 extend at such an angle that the lamps 138 and 139 may both have a central position in the casing, and both of the rear ends of the lamp sockets 136 and 137 are accessible for wiring. This base plate may be made of sheet metal, or as a die casting, and in the latter form the division wall 135 is divided vertically in two parts with the division line going through the center of the lamp sockets which are clamped tight in place in their respective positions by the screw bolt 140. This base plate 133 is mounted in a central position at the lower edge of the rear window, on the outside of the rear body wall with the screws 151, so that the top edge of the casing comes even with the lower edge of the rear window, as best shown in Figs. 1 and 2. The top of the casing 141 carries a green crystal 142, and a red crystal 143, and these crystals are fastened by sheet metal rings 142' and 143', respectively, which are spun over upon the inside of the casing, and the lamps 138 and 139, which are located right below these crystals, light them up strongly. Thus the operation of the rear signal can readily be seen by the driver in the windshield mirror 153 which, as indicated in Fig. 1, reflects the images of both crystals. This of course makes it possible for the driver to watch the proper operation of the rear signals while at the same time watching the rear traffic in the windshield mirror without extra effort, thus making unnecessary the provision of extra telltale lights, their wiring and extra attention by the driver.

One of the most important advantages of this manner of arranging the rear signal is that it conforms to the custom of hand signalling, where the driver in the rear watches the driver in front of him through the rear window, and cannot avoid seeing this rear signal R, which is prominent in its location and suggestive in its three cornered form, where the signs "Rite" and "Left" not only point sideways with their arrow points but also in a forward direction, while the design of the casing makes it fit closely to the body and harmonize with the contour of the rear of the car. Both the crystals and the translucent glass signs "Rite" and "Left" are mounted in a casing 141, which in this signal forms a cover embracing the base plate 133 and terminating in an arrow point at each end. Four screws 150 pass through the respective flanges of the base plate and cover and firmly hold these two parts together.

The mounting block 61 has a circular cut out 61' fitting against the steering post 100 to which it is firmly clamped by the bridge section 124 and bolt 125. This bearing block 61 is for pivotally mounting the lever L, and the ratchet 115, as described, and also for passing and holding the wire cables 71 and 82 in operative position. Both of these cables pass through a slot 71' in the outer end of the block and then into a long slot 63, from which the cable 82 passes through a bore 82' and then divides into two leads which pass to the lower ends of contacts 64 and 64' to which they are connected and held in place by nuts 69. Each of these contacts is provided with a spring 70 which holds it in frictional engagement with a non-conducting base plate 67 attached to the portion 105 of lever L by screws 67' and into which is molded a contact plate 65'. These parts form an even bearing surface for engagement with said contacts 64 and 64' when the contact plate 65' slides over them for the purpose of lighting up either the "Rite" or the "Left" rear signal.

The cable 71, which contains five wires and passes through slot 71", in bearing block 54, leads from the slot 63 through the hole 114 in an upward loop into a pocket 112 in the segmental portion 105 of lever L where it forms a U-shaped loop and is tied in a corner of the pocket by the cord 113. The wires are then separated and two wires 72 and 74 lead to the horn button switch 81' while two other wires 78 and 78" lead to the other horn button switch 80', and the fifth wire 66 leads to the connection 65 of the contact plate 65'. This wire 66 is indirectly connected to the terminal 76 of the vehicle storage battery 77, while each of the wires 83, 84 leads to one terminal of each of the lamps 138, 139 of the rear signal R, the other end of said wires 83, 84 uniting in the cable 82 which is indirectly connected to the battery terminal 75. These two wires 66 divide, one being connected to the other terminal of each lamp 138, 139, while the other end of the joint wires 66 connected to the terminal 65 which is the connection for the contact plate 65', which latter forms the switch for the rear signal R. This switch is normally out of contact, see Fig. 19, when the entire device is set for straight ahead driving, and is still out of contact while the device is set on the "Scenic-range", as shown in Fig. 14, for lighting up the scenery and the side of the road and ditch; however when the device is set over to the right-hand limit, the contact plate 65' swinging over then connects with the contact 64' thus completing the circuit to the lamp 139 which lights up the glass sign 147, showing the signal "Rite", as plainly shown in Fig. 2, in which case the driver sees the green crystal 142 lit up in the windshield mirror 153, as shown in Fig. 1. This same operation is repeated for lighting up the sign 148, showing "Left", and the red crystal 143 when the device is set over to the left-hand limit. Then the contact plate 65' rides on the contact 64, which completes the circuit for lighting up the "Left" sign and the red crystal 143.

The combination horn signal using two horns of different pitch and volume of sound is of great importance in making sound signalling more effective. For city driving, for instance, my direction signals given by the headlights and by the rear signal R would in many cases be sufficient to arrest the attention of other drivers and pedestrians, but by using a small horn 80 which can be sounded simultaneously with operation of the direction signals and at one motion of the hand of the driver attention is attracted to the direction signals. By using a small horn of relatively small sound volume it is possible to greatly reduce the noise in busy city streets. However, in case of grave danger, both horns can be sounded simultaneously as the button switches 80' and 81' for the horns 80 and 81 are within easy reach of the driver's right and left hands.

I thus combine the use of two horns with my signaling method, of which the smaller one 80 is of higher pitch and less volume of sound than the larger horn 81, which latter is of deep pitch and great sound. The smaller horn 80, which is used for the average driving is preferably mounted in the front of the car, for example on the fender 166, thus giving a chance for easy but concealed wiring, while the large horn 81 is suitably mounted underneath the hood 167. The wiring for the horn 81 comprises wire 73 leading from horn terminal 73' to the battery terminal 75 while the wire 72 leads from the horn terminal 72' to the button switch 81', and the return wire 74 leads from said switch to the battery terminal 76, thus completing this circuit. The wiring for the smaller horn 80 comprises the wire 79 leading from the horn terminal 79' to the battery terminal 75 and the wire 78 leading from the horn terminal 78' to the button switch 80', and the return wire 78" which leads from said switch indirectly to the battery terminal 76.

It will be noted that the slot 63 in the top surface of the mounting block 61 is tapering, and wider at the inner end near the pivot 59. This is for the purpose of accommodating side motion of the loop of the cable 71 lying in this slot during the limited swinging operation of the lever L about its pivot 59.

The U-shaped loop of the cable 71 is of considerable usefulness in facilitating wiring of the horn buttons. The wires for these buttons lead through the hollow arms 103 and 104 and the wiring can be easily done by pulling out the wires forming this loop so they extend out of the ends of the respective arms and then attaching the wires to the button switches. After the switches have been inserted into the ends of the arms the U-shaped loop may be pulled back and tied with the cord 113, as shown, and thus the wires and loop are retained in desired position. The same handling of the wires applies if any repairs are needed.

Figures 22, 23, 24, 25, 26, 27, 28, 29, 30:
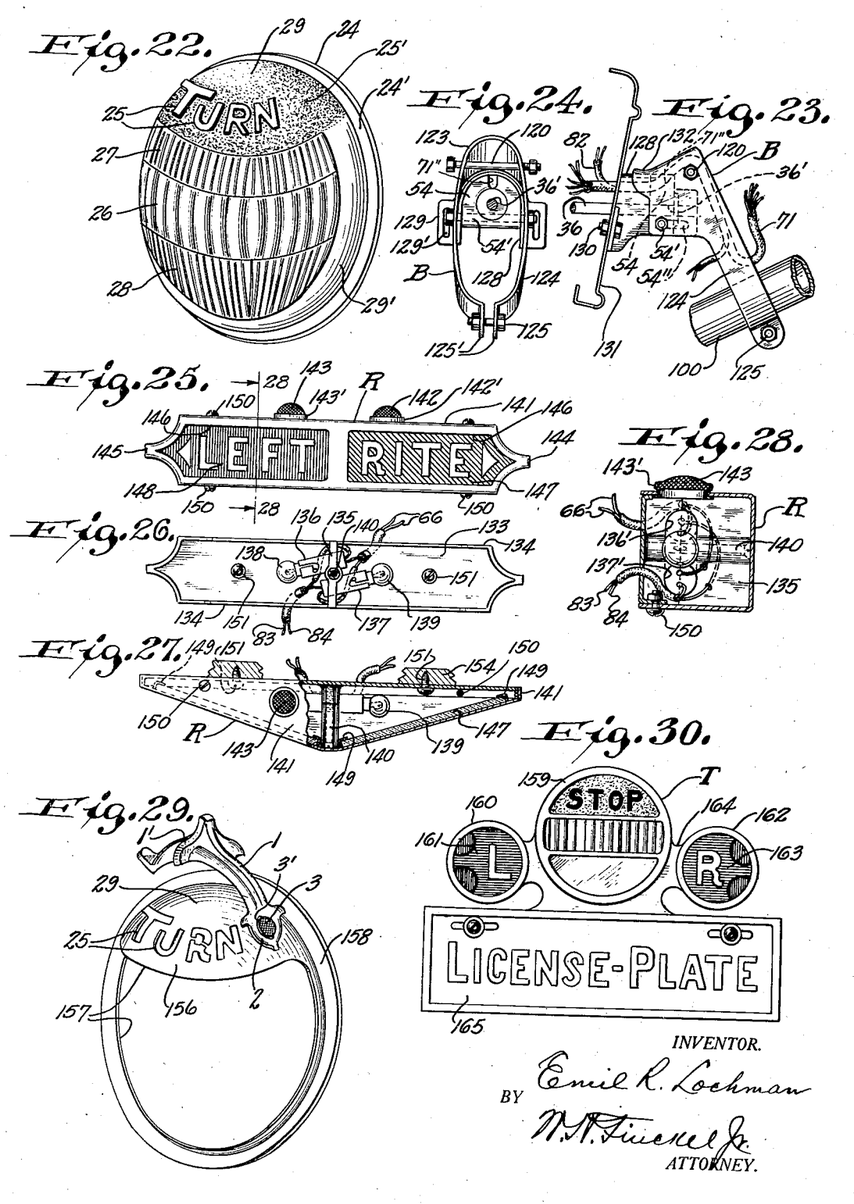
Fig. 22 is a perspective view of one of the curved headlight lenses.
Fig. 23 is a side view of the wiring bridge, showing the location and passage of the electric cables and the mounting of its opposite ends on the steering column and the instrument board of the automobile, respectively.
Fig. 24 is a front view of the wiring bridge showing the location and mounting of the bearing block for the front end of the reflector and pointer operating rod.
Fig. 25 is a front view of the rear signal.
Fig. 26 is a front view of the mounting plate or case of the rear signal of Fig. 25, showing the arrangement of the lights therein, and the wiring for said lights.
Fig. 27 is a plan view of this rear signal with parts broken away to show the interior.
Fig. 28 is a sectional view of the rear signal taken substantially on the line 28—28 of Fig. 25.
Fig. 29 is a perspective view showing an application of the pointer and indicator of my invention to the well known present day headlight having a flat lens.
Fig. 30 is a front view of a rear signal for right and left turn signalling, which is formed as a unit with the present day combination tail-light and license plate holder, and can readily be used with my controlling device.

The glass lens 24 used with my headlights is best shown in Fig. 22. Its top section 29 is either frosted or made of a somewhat darker shade, and the sign "Turn" is molded, preferably in relief, into the surface in a prominent manner, and is preferably clear, and the edges of this lettering may be shaded and suitably colored, if desired, so that the sign will show up plainly in daylight as well as at night and be visible at a considerable distance ahead. The section 26 is designed principally for spreading or diffusing the light, and its corrugations are shaped for this purpose. Moreover, due to the outwardly curved shape of my lens this action is considerably better than in a flat lens, and the same is true of the smaller corrugations of sections 27 and 28. The lens has, furthermore, a marginal clear section 29' which is of considerable importance in letting the sharply reflected light pass freely when the pointers 1 and movable reflectors 10 are set for either the right or left hand turn, as well as when they are set for a considerable angle for scenic and roadside lighting. The flange 24' is for mounting the lens in the headlight in the customary manner.

Fig. 29 shows another application of my invention, where the pointer 1 is used in connection with a transparent lens having the same curved upper section 156 with the sign "Turn" applied in the same manner and used for the same purpose as hereinbefore described, but having the lower sections removed and an opening 157 provided, so that this member may be used with the customary flat lens in compliance with certain local traffic regulations. Where a cheaper installation is needed, the entire part may be made of thin sheet metal and the sign "Turn" stamped out in stencil form, and the part thus made applied on top of the present flat lens, the thin flange 158 serving to mount the member in any headlight without change.

Obviously the stationary direction sign on the headlight in cooperation with a pointer or pointing means can readily be used without the movable reflector 10, and this will be particularly apparent where the device as shown in Fig. 29 is used with a headlamp of ordinary form having a flat lens.

The form of the rear signal T illustrated in Fig. 30 can be used with my combination signal system. This is a more conventional type of rear signal, and is combined with a combination tail and stop light 159. The illuminated left and right direction signals 160 and 162 are placed at the sides of the tail light 159 and all three of these lights are mounted on a common bracket or holder 164 to which the license plate is also connected. The left direction signal lens 161 shows an arrow head pointing to the left and a large letter L, and the right direction signal lens 163 shows an arrow head pointing to the right and a large letter R. The wiring of this signal will be the same as that used for my rear signal R hereinbefore described, and it would likewise be connected to the switch operated by the lever L. However, this signal has not the many advantages pointed out for the use of my rear signal R, as it does not conform to and simulate the present usage of hand signalling where, as stated, the driver in the rear watches the driver in front through the rear window.

My Patent No. 1,733,613, hereinbefore referred to, is for a headlight attachment, and while it has some features similar to the apparatus of my present invention, this present invention contemplates a complete headlight and signalling apparatus with totally different fundamental features in its construction and operation, and designed to give far superior results and consequently far greater value in use, both for the safety and enjoyment of the occupants of the car so equipped and for the protection and safety of the general public.

The movable reflectors 10 are properly set and focused after the headlights are completely installed, by loosening the binding screws 6 of the pointers 1, and then so focusing the reflectors 10 that the light streams b b from both headlights merge properly for side lighting of the road, or for giving the light signal across the street corner for turning as shown in Fig. 4. Then these binding screws 6 are tightened again to fix the hubs 5' upon the pivots 8 for positive joint action of the pointers 1 with the reflectors 10.

From the foregoing description it will be seen that the improved combination headlight, together with the improved signalling means, comprising front signals from the headlights, improved rear signals, and sound signals, all operated by the driver without releasing his hands from the steering wheel, is of practical, simple and efficient construction and well adapted for the purposes described.

Various changes in the construction and arrangement of parts and in the mode of operation of the apparatus are considered to be within the spirit of the invention and the scope of the following claims.

What I claim is:—

1. In a combination road lighting and signalling device, a headlight having the usual reflector and lamp, a second reflector pivotally mounted on a vertical axis within the usual reflector, a portion of said second reflector extending forwardly and a portion rearwardly of its vertical axis, said rearward portion extending into proximity to said lamp and being shaped to avoid contact with the lamp and to permit its rays to pass the edge of the reflector, the entire reflector being so shaped that when set in angular position the side nearest the lamp coacting with the usual reflector will throw a strong section of light in an angular direction, while the side away from the lamp will act as a dimmer, so that the forwardly projected light is less bright than said angularly projected light, while the remainder of the light is bright, and all three sections of light merge in a continuous stream, and means for pivotally adjusting said movable reflector whereby the projected light may be employed for road lighting and signalling purposes.

2. A signalling device for vehicles, including a headlight having a casing, and a lens provided at its front upper portion with a directional legend indicating a turn, a pointer pivotally mounted on said casing above and adjacent to said legend and having a part extending in proximity to and movable relatively to said legend and within the field of illumination of said headlight, and means for moving said pointer to indicate a contemplated turn of the vehicle.

3. A signalling device for vehicles, including a headlight having a casing, and a lens provided at its front upper portion with a directional legend indicating a turn, a pointer pivotally mounted on said casing above and adjacent to said legend and having a part provided with a translucent crystal extending in proximity to and movable relatively to said legend and within the field of illumination of said headlight, whereby said crystal is illuminated and the pointer accentuated, and means for moving said pointer to indicate a contemplated turn of the vehicle.

4. A signalling device for vehicles, including a headlight having a casing, and a lens provided at its front upper portion with a directional legend indicating a turn, and a lamp, a reflector movably mounted within said headlight casing and capable of adjustment with respect to said lamp for the purpose of projecting the light of said lamp laterally, a pointer movably mounted on said casing and visible from in front of the vehicle and having a part extending downwardly over said legend in position to be illuminated by said lamp, and means for jointly moving said reflector and pointer to indicate by said pointer and by the laterally projected light from said reflector that a turn to right or left is to be made.

5. In combination, a headlight having the customary stationary reflector and lamp, an outwardly curved lens, a movable reflector pivotally mounted within said headlight upon a substantially vertical axis in cooperative relation to said stationary reflector and said curved lens, said movable reflector having a section extending rearwardly of said vertical axis and in proximity to said lamp and shaped to cooperate with said lamp to direct the light rays thereof upon movement of the reflector, and a section extending forwardly of said vertical axis and into said curved lens, and means for pivotally adjusting and setting said movable reflector in predetermined appropriate positions for directing the light rays of said lamp through said lens for signalling a right turn and a left turn and for road lighting purposes.

6. A signalling device for vehicles, including a headlight having the customary casing, stationary reflector and lamp, an outwardly curved lens, a movable reflector pivotally mounted within said casing between said stationary reflector and said curved lens, a pointer arranged exteriorly of said casing and connected with said movable reflector for simultaneous pivotal movement, said pointer adapted to overhang said curved lens, said pointer and movable reflector adapted for cooperative action with said curved lens for visible signalling for a right turn and for a left turn.

7. A signalling device for vehicles, including a headlight having the customary casing, stationary reflector and lamp, an outwardly curved lens, a movable reflector pivotally mounted within said casing between said stationary reflector and said curved lens and extending into said curved lens, said movable reflector formed with opposite concave and convex reflecting surfaces and due to its pivotal mounting being angularly adjustable with respect to said stationary reflector, each of said surfaces adapted for reflecting light from said lamp in beams of predetermined diffusion and providing combination signalling and roadlighting varying in accordance with the angle of adjustment of said movable reflector relatively to said stationary reflector.

8. In combination, a headlight having a stationary reflector, a movable reflector pivotally mounted within said headlight in operative relation to the stationary reflector upon a substantially vertical axis, said movable reflector having opposite concave and convex reflecting surfaces for reflecting light in directions within predetermined limits, a lens mounted in said headlight in front of said reflectors and bearing at its upper portion a legend indicating a turn, and a movable pointer pivotally mounted adjacent to said lens and having a portion extending downwardly over said legend in position to be illuminated by said headlight cooperating with said legend, said pointer and movable reflector interconnected for simultaneous pivotal action, for giving a readable direction signal indicated by cooperation of said pointer and legend, in combination with a light stream signal as produced by said movable reflector.

9. In a signal device for automobiles, a headlight, means for utilizing said headlight for road lighting and signalling, said means including the usual reflector and lamp and an outwardly curved lens having a central corrugated section, two clear sections flanking same and an upper section bearing direction indicia, a pointer arranged upon said headlight and having a portion extending downwardly over said direction indicia in position to be illuminated by said lamp and mounted for pivotal movement relatively to said indicia, and a movable reflector for said headlight, said movable reflector mounted upon a substantially vertical pivot whereby it may be oscillated to project the light from said lamp laterally, said pointer and movable reflector arranged for simultaneous pivotal action in relation to said lens for giving a readable direction signal for a right turn or a left turn in combination with a light stream signal directed concurrently to right or left.

10. In a combined signalling and road lighting device for automobiles, a headlight, said headlight having an outwardly curved lens and the usual reflector and lamp, a movable reflector pivotally mounted upon a substantially vertical axis relatively to said usual reflector, and having opposite concave and convex reflecting surfaces cooperating with and extending into said usual reflector and said curved lens, and a manually operable controlling apparatus for moving said reflector upon its pivotal mounting, whereby the concave surface thereof may be adjusted for signalling a right turn and for road lighting by control of the light of said headlight, and the convex surface may be adjusted for dimming said light and for signalling a left turn.

11. A signalling device for vehicles, including a headlight having a casing, a convex lens mounted in said casing with its convexity producing a pronounced outward curve forwardly thereof, said lens provided at its upper portion with a directional legend indicating a turn, a pointer pivotally mounted on said casing above and adjacent to said legend and having a part extending downwardly over said legend and curved to substantially conform to the convexity of said lens, said pointer movable relatively to said legend and within the field of illumination of said headlight, and means for moving said pointer to indicate a contemplated turn of the vehicle.

12. A signalling device for vehicles, including a headlight having a casing, a convex lens mounted in said casing with its convexity extending forwardly thereof, said lens provided at its upper front portion with a directional legend indicating a turn, and a lamp, a reflector movably mounted within said headlight casing and capable of adjustment with respect to said lamp for the purpose of projecting the light of said lamp laterally, a pointer movably mounted on said casing, said pointer having a part curved to substantially conform to the convexity of said lens and extending downwardly over said legend in position to be illuminated by said lamp, and means for jointly moving said reflector and pointer to indicate by said pointer and by the laterally projected light from said reflector that a turn to right or left is to be made.

EMIL R. LOCHMAN.